United States Patent
Connell, II et al.

(10) Patent No.: US 12,027,024 B2
(45) Date of Patent: Jul. 2, 2024

(54) GUNSHOT DETECTION SYSTEM WITH ENCRYPTED, WIRELESS TRANSMISSION

(71) Applicant: Johnson Controls Fire Protection LP, Boca Raton, FL (US)

(72) Inventors: Thomas Wysong Connell, II, Westminster, MA (US); Alan Levin, III, Bolton, MA (US); Timothy L. Ficarra, Billerica, MA (US)

(73) Assignee: TYCO FIRE & SECURITY GMBH, Neuhausen Am Rheinfall (CH)

( * ) Notice: Subject to any disclaimer, the term of this patent is extended or adjusted under 35 U.S.C. 154(b) by 904 days.

(21) Appl. No.: 16/968,933

(22) PCT Filed: Feb. 14, 2019

(86) PCT No.: PCT/IB2019/051204
§ 371 (c)(1),
(2) Date: Aug. 11, 2020

(87) PCT Pub. No.: WO2019/159100
PCT Pub. Date: Aug. 22, 2019

(65) Prior Publication Data
US 2021/0049720 A1 Feb. 18, 2021

Related U.S. Application Data

(60) Provisional application No. 62/637,161, filed on Mar. 1, 2018, provisional application No. 62/631,296, filed on Feb. 15, 2018.

(51) Int. Cl.
*G06F 21/60* (2013.01)
*G06F 16/61* (2019.01)
(Continued)

(52) U.S. Cl.
CPC ......... *G08B 13/1672* (2013.01); *G06F 16/61* (2019.01); *G06F 21/602* (2013.01);
(Continued)

(58) Field of Classification Search
CPC .... G08B 13/1672; G08B 7/066; G08B 17/00; G08B 17/06; G08B 19/00; G08B 25/014;
(Continued)

(56) References Cited

U.S. PATENT DOCUMENTS 4,709,330 A 11/1987 Yokoi et al.
5,504,717 A 4/1996 Sharkey et al.
(Continued)

FOREIGN PATENT DOCUMENTS

CN 102 843 205 B 12/2012
EP 1 806 952 A2 7/2007
(Continued)

OTHER PUBLICATIONS

International Preliminary Report on Patentability dated Aug. 27, 2020 from International Application No. PCT/IB2019/051202, filed on Feb. 14, 2019. 14 pages. (WO1).
(Continued)

*Primary Examiner* — Brandon Hoffman
*Assistant Examiner* — Nega Woldemariam
(74) *Attorney, Agent, or Firm* — HoustonHogle LLP (57) ABSTRACT

A gunshot detection system includes gunshot sensor units and a control panel. The gunshot sensor units generate audio data and encrypt the audio data using an encryption key before storing the audio data and/or sending it to the control panel. The control panel decrypts received encrypted audio data using a decryption key. The encryption keys might be programmed at the control panel and distributed to the gunshot sensor units. The control panel would also store decryption keys for decrypting the audio data from each of (Continued)

the different gunshot sensor units. An additional layer of end-to-end encryption is provided for messages exchanged between the devices. The gunshot sensor units can also be equipped with wireless interfaces for communicating with the control panel over a communication network. To address potential bandwidth issues, the gunshot sensor units determine current network conditions and compress the audio data based on the current network conditions.

20 Claims, 8 Drawing Sheets

(51) Int. Cl.

| | | |
|---|---|---|
| *G06Q 50/26* | (2012.01) | |
| *G07C 9/00* | (2020.01) | |
| *G08B 7/06* | (2006.01) | |
| *G08B 13/16* | (2006.01) | |
| *G08B 17/00* | (2006.01) | |
| *G08B 17/06* | (2006.01) | |
| *G08B 19/00* | (2006.01) | |
| *G08B 25/01* | (2006.01) | |
| *G08B 25/04* | (2006.01) | |
| *G08B 25/10* | (2006.01) | |
| *G08B 25/14* | (2006.01) | |
| *G08B 29/18* | (2006.01) | |
| *G08B 29/24* | (2006.01) | |
| *H04L 9/08* | (2006.01) | |
| *H04L 9/14* | (2006.01) | |
| *H04L 41/06* | (2022.01) | |
| *H04W 4/029* | (2018.01) | |
| *H04W 4/38* | (2018.01) | |
| *H04W 4/90* | (2018.01) | |
| *H04W 12/037* | (2021.01) | |
| *H04W 56/00* | (2009.01) | |
| *H04W 84/18* | (2009.01) | |
| *H04W 84/20* | (2009.01) | |

(52) U.S. Cl.
CPC ....... *G06Q 50/265* (2013.01); *G07C 9/00182* (2013.01); *G08B 7/066* (2013.01); *G08B 17/00* (2013.01); *G08B 17/06* (2013.01); *G08B 19/00* (2013.01); *G08B 25/014* (2013.01); *G08B 25/04* (2013.01); *G08B 25/10* (2013.01); *G08B 25/14* (2013.01); *G08B 29/188* (2013.01); *G08B 29/24* (2013.01); *H04L 9/0894* (2013.01); *H04L 9/14* (2013.01); *H04L 41/06* (2013.01); *H04W 4/029* (2018.02); *H04W 4/38* (2018.02); *H04W 4/90* (2018.02); *H04W 12/037* (2021.01); *H04W 56/0015* (2013.01); *H04W 84/18* (2013.01); *H04W 84/20* (2013.01)

(58) Field of Classification Search
CPC ........ G08B 25/04; G08B 25/10; G08B 25/14; G08B 29/188; G08B 29/24; G06F 16/61; G06F 21/602; G06Q 50/265; G07C 9/00182; H04L 9/0894; H04L 9/14; H04L 41/06; H04W 4/029; H04W 4/38; H04W 4/90; H04W 12/037; H04W 56/0015; H04W 84/18; H04W 84/20
USPC ...................................................... 713/164
See application file for complete search history.

(56) References Cited

U.S. PATENT DOCUMENTS

| | | |
|---|---|---|
| 5,973,998 A | 10/1999 | Showen et al. |
| 6,552,963 B2 | 4/2003 | Baranek et al. |
| 6,970,183 B1 | 11/2005 | Monroe |
| 7,228,429 B2 | 6/2007 | Monroe |
| 7,411,865 B2 | 8/2008 | Calhoun |
| 7,460,006 B2 | 12/2008 | Kates |
| 7,676,194 B2 | 3/2010 | Rappaport |
| 7,843,356 B2 | 11/2010 | Webb |
| 7,986,231 B1 | 7/2011 | Bentley et al. |
| 8,149,649 B1 | 4/2012 | Brinn et al. |
| 8,589,994 B2 | 11/2013 | Monroe |
| 8,806,632 B2 | 8/2014 | Stefanidakis et al. |
| 9,432,720 B2 | 8/2016 | Kruglick |
| 9,642,131 B2 | 5/2017 | Bohlander et al. |
| 9,672,700 B2 | 6/2017 | Lax |
| 9,672,727 B1 | 6/2017 | Alexander et al. |
| 9,679,459 B2 | 6/2017 | Crowe |
| 9,830,932 B1 | 11/2017 | Gunderson et al. |
| 9,875,643 B1 | 1/2018 | Sarna, II |
| 9,888,371 B1 | 2/2018 | Jacob |
| 10,089,845 B2 | 10/2018 | Skorpik et al. |
| 10,102,732 B2 | 10/2018 | Gersten |
| 10,586,109 B1 | 3/2020 | Fowler et al. |
| 10,657,800 B1 | 5/2020 | Fowler et al. |
| 10,741,058 B1 | 8/2020 | Miller |
| 10,928,244 B2 | 2/2021 | Warren et al. |
| 11,133,021 B2 | 9/2021 | Davis et al. |
| 11,170,619 B2 | 11/2021 | Connell, II et al. |
| 11,282,536 B2 | 3/2022 | Davis et al. |
| 2006/0109113 A1 | 5/2006 | Reyes et al. |
| 2008/0165621 A1 | 7/2008 | Fisher et al. |
| 2009/0222241 A1 | 9/2009 | Dorogi et al. |
| 2010/0142715 A1 | 6/2010 | Goldstein et al. |
| 2010/0245583 A1* | 9/2010 | Harel ............... G08B 13/19656 348/E7.001 |
| 2010/0271905 A1 | 10/2010 | Khan et al. |
| 2010/0305778 A1 | 12/2010 | Dorneich et al. |
| 2011/0169633 A1 | 7/2011 | Lauder et al. |
| 2012/0174012 A1* | 7/2012 | Tsai ...................... G06F 9/543 715/769 |
| 2014/0218518 A1 | 8/2014 | Oliver |
| 2014/0222943 A1 | 8/2014 | Oleson et al. |
| 2014/0269199 A1 | 9/2014 | Weldon et al. |
| 2014/0277609 A1 | 9/2014 | Nye et al. |
| 2014/0327543 A1 | 11/2014 | Showen et al. |
| 2014/0340222 A1 | 11/2014 | Thornton et al. |
| 2015/0061869 A1 | 3/2015 | Crowe et al. |
| 2015/0070166 A1 | 3/2015 | Boyden et al. |
| 2015/0077550 A1 | 3/2015 | Apelbaum et al. |
| 2015/0339913 A1 | 11/2015 | Lyman et al. |
| 2015/0347079 A1 | 12/2015 | Price et al. |
| 2016/0232774 A1 | 8/2016 | Noland et al. |
| 2016/0260307 A1 | 9/2016 | Skorpik et al. |
| 2016/0269397 A1 | 9/2016 | Camenisch et al. |
| 2016/0379456 A1 | 12/2016 | Nongpiur et al. |
| 2017/0019264 A1 | 1/2017 | Nugent et al. |
| 2017/0045336 A1 | 2/2017 | Crowe et al. |
| 2017/0069190 A1 | 3/2017 | Hansen et al. |
| 2017/0103643 A1 | 4/2017 | Powers, III et al. |
| 2017/0169686 A1 | 6/2017 | Skorpik et al. |
| 2017/0289650 A1 | 10/2017 | Schattmaier et al. |
| 2017/0301220 A1 | 10/2017 | Jarrell et al. |
| 2018/0053394 A1 | 2/2018 | Gersten |
| 2018/0122030 A1 | 5/2018 | Raz et al. |
| 2018/0160278 A1 | 6/2018 | Patel et al. |
| 2018/0199179 A1 | 7/2018 | Rauner |
| 2018/0308475 A1 | 10/2018 | Locke et al. |
| 2019/0024918 A1 | 1/2019 | Brissette et al. |
| 2019/0130723 A1 | 5/2019 | Thiel et al. |
| 2019/0213901 A1 | 7/2019 | Kur et al. |
| 2019/0347920 A1 | 11/2019 | Anderson et al. |

(56) References Cited

U.S. PATENT DOCUMENTS

| | | |
|---|---|---|
| 2021/0158837 A1 | 5/2021 | Saki et al. |
| 2021/0202067 A1 | 7/2021 | Williams et al. |

FOREIGN PATENT DOCUMENTS

| | | |
|---|---|---|
| EP | 3032508 A1 | 6/2016 |
| JP | 2001236822 A | 8/2001 |
| JP | 4973380 B2 | 7/2012 |
| JP | 2017520831 | 7/2017 |
| WO | WO 9110980 | 7/1991 |
| WO | WO 2010039130 | 4/2010 |
| WO | WO 2010111556 | 9/2010 |
| WO | WO 2011134371 | 11/2011 |
| WO | WO 2012092562 | 7/2012 |
| WO | WO 2017070741 | 5/2017 |
| WO | WO 2017122119 | 7/2017 |
| WO | WO 2018044553 | 3/2018 |
| WO | WO 2018044556 | 3/2018 |
| WO | WO 2018185723 | 10/2018 |
| WO | WO 2019159098 | 8/2019 |
| WO | WO 2019159099 | 8/2019 |
| WO | WO 2019159101 | 8/2019 |
| WO | WO 2019159102 | 8/2019 |
| WO | WO 2019159103 | 8/2019 |
| WO | WO 2019159104 | 8/2019 |
| WO | WO 2019159105 | 8/2019 |
| WO | WO 2019159106 | 8/2019 |

OTHER PUBLICATIONS

International Preliminary Report on Patentability dated Aug. 27, 2020, from International Application No. PCT/IB2019/051203, filed on Feb. 14, 2019. 7 pages. (WO2).
International Preliminary Report on Patentability dated Aug. 27, 2020, from International Application No. PCT/IB2019/051204, filed on Feb. 14, 2019. 9 pages. (WO3).
International Preliminary Report on Patentability dated Aug. 27, 2020, from International Application No. PCT/IB2019/051205, filed on Feb. 14, 2019. 23 pages. (WO4).
International Preliminary Report on Patentability dated Aug. 27, 2020, from International Application No. PCT/IB2019/051206, filed on Feb. 14, 2019. 8 pages. (WO5).
International Preliminary Report on Patentability dated Aug. 27, 2020, from International Application No. PCT/IB2019/051207, filed on Feb. 14, 2019. 8 pages. (WO6).
International Preliminary Report on Patentability dated Aug. 27, 2020, from International Application No. PCT/IB2019/051208, filed on Feb. 14, 2019. 12 pages. (WO7).
International Preliminary Report on Patentability dated Aug. 27, 2020, from International Application No. PCT/IB2019/051209, filed on Feb. 14, 2019. 12 pages. (WO8).
International Preliminary Report on Patentability dated Aug. 27, 2020, from International Application No. PCT/IB2019/051210, filed on Feb. 14, 2019. 9 pages. (WO9).
Examination Report dated Oct. 10, 2022 from EP Application No. 19 707 130.1, filed on Feb. 14, 2019. 7 pages. (EP1).
Examination Report dated Nov. 2, 2022, from EP Application No. 19 711 166.9, filed on Feb. 14, 2019. 10 pages. (EP2).
Examination Report dated Oct. 26, 2022, from EP Application No. 19 711 167.7, filed on Feb. 14, 2019. 9 pages. (EP3).
Examination Report dated Oct. 14, 2022, from EP Application No. 19 710 785.7, filed on Feb. 14, 2019. 9 pages. (EP4).
Examination Report dated Oct. 21, 2022, from EP Application No. 19 711 419.2, filed on Feb. 14, 2019. 9 pages. (EP6).
Examination Report dated Oct. 20, 2022, from EP Application No. 19 711 420.0, filed on Feb. 14, 2019. 9 pages. (EP7).
Examination Report dated Oct. 14, 2022, from EP Application No. 19 711 168.5, filed on Feb. 14, 2019. 6 pages. (EP8).
Examination Report dated Oct. 25, 2022, from EP Application No. 19 710 786.5, filed on Feb. 14, 2019. 9 pages. (EP9).
McIntire, J., et al., "AFRL Commander's Challenge 2015: Stopping the Active Shooter," Proceedings of SPIE, 10184: 101840E1-101840E14 (2017).
International Search Report and Written Opinion of the International Searching Authority, dated Jun. 18, 2019, from International Application No. PCT/IB2019/051202, filed on Feb. 14, 2019. 24 pages. (WO1).
International Search Report and Written Opinion of the International Searching Authority, dated May 21, 2019, from International Application No. PCT/IB2019/051203, filed on Feb. 14, 2019. 13 pages. (WO2).
International Search Report and Written Opinion of the International Searching Authority, dated May 14, 2019, from International Application No. PCT/IB2019/051204, filed on Feb. 14, 2019. 15 pages. (WO3).
International Search Report and Written Opinion of the International Searching Authority, dated Jul. 12, 2019, from International Application No. PCT/IB2019/051205, filed on Feb. 14, 2019. 23 pages. (WO4).
International Search Report and Written Opinion of the International Searching Authority, dated Jun. 12, 2019, from International Application No. PCT/IB2019/051206, filed on Feb. 14, 2019. 13 pages. (WO5).
International Search Report and Written Opinion of the International Searching Authority, dated Jun. 14, 2019, from International Application No. PCT/IB2019/051207, filed on Feb. 14, 2019. 13 pages. (WO6).
International Search Report and Written Opinion of the International Searching Authority, dated May 31, 2019, from International Application No. PCT/IB2019/051208, filed on Feb. 14, 2019. 18 pages. (WO7).
International Search Report and Written Opinion of the International Searching Authority, dated Jul. 23, 2019, from International Application No. PCT/IB2019/051209, filed on Feb. 14, 2019. 20 pages. (WO8).
International Search Report and Written Opinion of the International Searching Authority, dated May 24, 2019, from International Application No. PCT/IB2019/051210, filed on Feb. 14, 2019. 15 pages. (WO9).
Partial Search Report dated Apr. 24, 2019, from International Application No. PCT/IB2019/051202, filed on Feb. 14, 2019. 14 pages. (WO1).
Partial Search Report dated May 17, 2019, from International Application No. PCT/IB2019/051205, filed on Feb. 14, 2019. 13 pages. (WO4).
Partial Search Report dated May 31, 2019, from International Application No. PCT/IB2019/051209, filed on Feb. 14, 2019. 12 pages. (WO8).

* cited by examiner

GUNSHOT DETECTION SYSTEM WITH ENCRYPTED, WIRELESS TRANSMISSION

RELATED APPLICATIONS

This application is a § 371 National Phase Application of International Application No. PCT/IB2019/051204, filed on Feb. 14, 2019, which claims the benefit under 35 USC 119(e) of U.S. Provisional Application No. 62/631,296, filed on Feb. 15, 2018, and U.S. Provisional Application No. 62/637,161, filed on Mar. 1, 2018, both of which are incorporated herein by reference in their entirety.

This application is related to:

International Application number PCT/IB2019/051202 filed Feb. 14, 2019, entitled "Gunshot detection system with forensic data retention, live audio monitoring, and two-way communication," now International Patent Publication No.: WO 2019/159098;

International Application number PCT/IB2019/051203 filed on Feb. 14, 2019, entitled "Gunshot detection system with master slave timing architecture," now International Patent Publication No.: WO 2019/159099;

International Application number PCT/IB2019/051205 filed on Feb. 14, 2019, entitled "Gunshot detection system with building management system integration," now International Patent Publication No.: WO 2019/159101;

International Application number PCT/IB2019/051206 filed on Feb. 14, 2019, entitled "Gunshot detection system anti-tampering protection," now International Patent Publication No.: WO 2019/159102;

International Application number PCT/IB2019/051207 filed on Feb. 14, 2019, entitled "Gunshot detection system with ambient noise modeling and monitoring," now International Patent Publication No.: WO 2019/159103;

International Application number PCT/IB2019/051208 filed on Feb. 14, 2019, entitled "Gunshot detection system with fire alarm system integration," now International Patent Publication No.: WO 2019/159104;

International Application number PCT/IB2019/051209 filed on Feb. 14, 2019, entitled "Gunshot detection sensors incorporated into building management devices," now International Patent Publication No.: WO 2019/159105; and International Application number PCT/IB2019/051210 filed on Feb. 14, 2019, entitled "Gunshot detection system with location tracking," now International Patent Publication No.: WO 2019/159106.

All of the afore-mentioned applications are incorporated herein by this reference in their entirety.

BACKGROUND OF THE INVENTION

Shooting incidents, involving active shooters shooting victims within buildings such as schools or malls, are increasingly a concern. Identifying and reacting quickly to such incidents can reduce loss of life. For example, first responders need to know if gunshots have actually been fired and the location and number of the fired shots.

In confined areas, such as in a school or a private or public building, detecting and locating the source of gunshots is a complicated problem. A gunshot typically generates several sounds including the gunshot itself, the bullet's bow shockwave, noise from bullet impacts and noise of reflected gunshot sounds. In addition, numerous noises are generated in buildings that may be mistakenly identified as gunshots.

The broad concept of detecting gunshots utilizing acoustics is known. More specifically, it is known to provide a gunshot detection system including an array of acoustic sensors positioned in a pattern which enables signals from the sensors to be employed to not only detect the firing of a gunshot but to also locate the origin of the shot. One main requirement of such a system is the need to accurately distinguish between the sound produced from a gunshot and a host of other ambient sounds. In at least one known arrangement, a microphone is used to detect each sound, which is then amplified, converted to an electrical signal and then the electrical signal is compared with a threshold value above which a gunshot sound is expected to exceed.

Recently, gunshot detection systems with improved accuracy, dependability, and effectiveness have been described. One such system is described in International Publication Number WO 2018/044553, published on Mar. 8, 2018 and entitled "System and Method for Acoustically Identifying Gunshots Fired Indoors." This system provides for low false alarms or false positives and high detection rates by employing two microelectromechanical microphones (MEMs) having different sensitivity levels. Acoustic signals from a first microphone with lower sensitivity (for example, making the anomaly detection microphone essentially deaf to routine sounds) are first analyzed for a peak amplitude level large enough to be a potential gunshot. Then acoustic signals from a second microphone having a higher sensitivity are then analyzed further to confirm that the sound was a gunshot.

Gunshot detection methods have also been proposed that can count the number of gunshots fired, particularly from an automatic or fast acting weapon. One such method is described in International Publication Number WO 2018/044556, published on Mar. 8, 2018 and entitled "Method for Acoustically Counting Gunshots Fired Indoors." In this method, an acoustic signature of captured noise is analyzed to accurately count how many shots are fired. The method can be employed to identify that the gun is an automatic or rapid fire weapon, which information can be provided to emergency personnel.

Additionally, gunshot detection system that can accurately determine where sensed events are located have been proposed. One such system is described in International Publication Number WO 2018/185723, published on Oct. 11, 2018 and entitled "System and Method for Identifying and Locating Sensed Events." Here, a sensor network is employed to detect an event in the form of an audible signal. The event is time stamped and sent to a controller, which evaluates the event as either unique or a multiple detection using the sensor's time of alarm to determine which sensor activated first and to suppress subsequent alarms for the same event. This process is known as de-confliction.

SUMMARY OF THE INVENTION

Especially as gunshot detection systems become more prevalent, security concerns must addressed. It is important to prevent third parties from intercepting and/or forging and/or downloading captured audio information.

Such concerns exist in a number of different topologies. Certainly, it would be desirable to encrypt the audio data stored on the sensor units and/or transmitted by the sensor units and/or stored by the control panel. This applies to wired systems as well as wireless/wired hybrid systems and all-wireless systems. Specially, wireless-equipped gunshot sensor units would allow greater flexibility in installing and maintaining the units while minimizing costs. But, the wireless aspect exacerbates existing security concerns. In particular, there is a need to prevent third parties from intercepting and/or contaminating and/or spoofing the signals exchanged between the gunshot sensor units and/or a control panel during or after a gunshot detection event.

A gunshot detection system according to the present invention includes gunshot sensor units that generate audio data depicting acoustic anomalies detected by the units. The gunshot sensor units then encrypt the audio data before storing it and/or sending it to the control panel. The control panel can similarly store the encrypted audio data and decrypt the audio data before presenting it (e.g. via speakers) to an operator of the control panel. Encryption and decryption keys are used by the gunshot sensor units and the control panel to encrypt and decrypt the audio data. Encryption keys might be programmed at the control panel and distributed to the gunshot sensor units or generated by an outside program and used by the control panel. The control panel would also store decryption keys for decrypting the audio data from each of the different gunshot sensor units or request those keys from an outside system or source based on the security privileges of the operator of the control panel.

An additional layer of end-to-end encryption is also provided. The gunshot sensor units and the control panel are equipped with encryption/decryption modules for encrypting and decrypting messages exchanged between the devices and/or one or both could be make requests for these services, which are then are processed outside the system. These messages might include the encrypted audio data.

Although the encryption functionality can work with existing wired communication infrastructures for gunshot detection systems, in the preferred embodiment, the gunshot sensor units and possibly even the control panel are equipped with wireless network interfaces for wirelessly communicating with each other over a communication network. To address potential bandwidth issues, the gunshot sensor units can monitor the communication network to discern network conditions. Compression modules of the gunshot sensor units are configured to compress the audio data before encryption based on the current network conditions.

In general, according to one aspect, the invention features a system for detecting gunshots within a premises. The system comprises gunshot sensor units, which detect gunshots. The gunshot sensor units detect acoustic anomalies and generate audio data via one or more microphones of the gunshot sensor units, and controllers of the gunshot sensor units encrypt the audio data.

In embodiments, the gunshot sensor units might store the encrypted audio data in local nonvolatile storage of the gunshot sensor units, along with audio encryption keys that are used to encrypt the audio data. The encrypted audio data can also be sent to a control panel of the gunshot detection system, which has a controller configured to receive and decrypt the encrypted audio data. The control panel might store a symmetric decryption key or asymmetric decryption keys associated with each gunshot sensor unit in its nonvolatile memory, the decryption keys being used to decrypt the audio data. The control panel could distribute the symmetric or asymmetric audio encryption keys to the gunshot sensor units, periodically sending updated the audio encryption keys. In addition, the gunshot sensor units can generate messages including the encrypted audio data and further encrypt these messages via encryption/decryption modules of the gunshot sensor units. The control panel would similarly decrypt the messages via its own encryption decryption module before decrypting the encrypted audio data contained in the messages. The gunshot sensor units might wirelessly send the encrypted audio data over a communication network via wireless network interfaces.

In general, according to another aspect, the invention features a method for detecting gunshots within a premises. Gunshot sensor units detect acoustic anomalies, generate audio data depicting the acoustic anomalies via one or more microphones, and encrypt the audio data.

In general, according to another aspect, the invention features a system for detection gunshots within a premises. Gunshot sensor units, which detect gunshots, comprise controllers for exchanging messages with a control panel via network interfaces and a communication network. The gunshot sensor units encrypt messages to be sent to the control panel and decrypt encrypted messages received from the control panel.

In general, according to another aspect, the invention features a method for detecting gunshots within a premises. Messages to be sent from gunshot sensor units to a control panel are encrypted, and messages to be received by the gunshot sensor units from the control panel are decrypted. The encrypted messages are sent and received to and from the control panel via network interfaces of the gunshot sensor units and a communication network.

In general, according to another aspect, the invention features a system for detecting gunshots within a premises. Gunshot sensor units, which detect gunshots, wirelessly communicate with a control panel via wireless network interfaces and a communication network.

In one example, each of the gunshot sensor units detect acoustic anomalies and generate audio data depicting the acoustic anomalies via one or more microphones. An audio data compression module executing on the controller determines network conditions of the communication network, compresses the audio data based on the network conditions and sends the compressed audio data to the control panel via the wireless network interface.

In general, according to another aspect, the invention features a method for detecting gunshots within a premises. Gunshot sensor units detect gunshots and wirelessly communicate with a control panel over a communication network via wireless network interfaces.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As used herein, the term "and/or" includes any and all combinations of one or more of the associated listed items. Further, the singular forms and the articles "a", "an" and "the" are intended to include the plural forms as well, unless expressly stated otherwise. It will be further understood that the terms: includes, comprises, including and/or comprising, when used in this specification, specify the presence of stated features, integers, steps, operations, elements, and/or components, but do not preclude the presence or addition of one or more other features, integers, steps, operations, elements, components, and/or groups thereof. Further, it will be understood that when an element, including component or subsystem, is referred to and/or shown as being connected or coupled to another element, it can be directly connected or coupled to the other element or intervening elements may be present.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
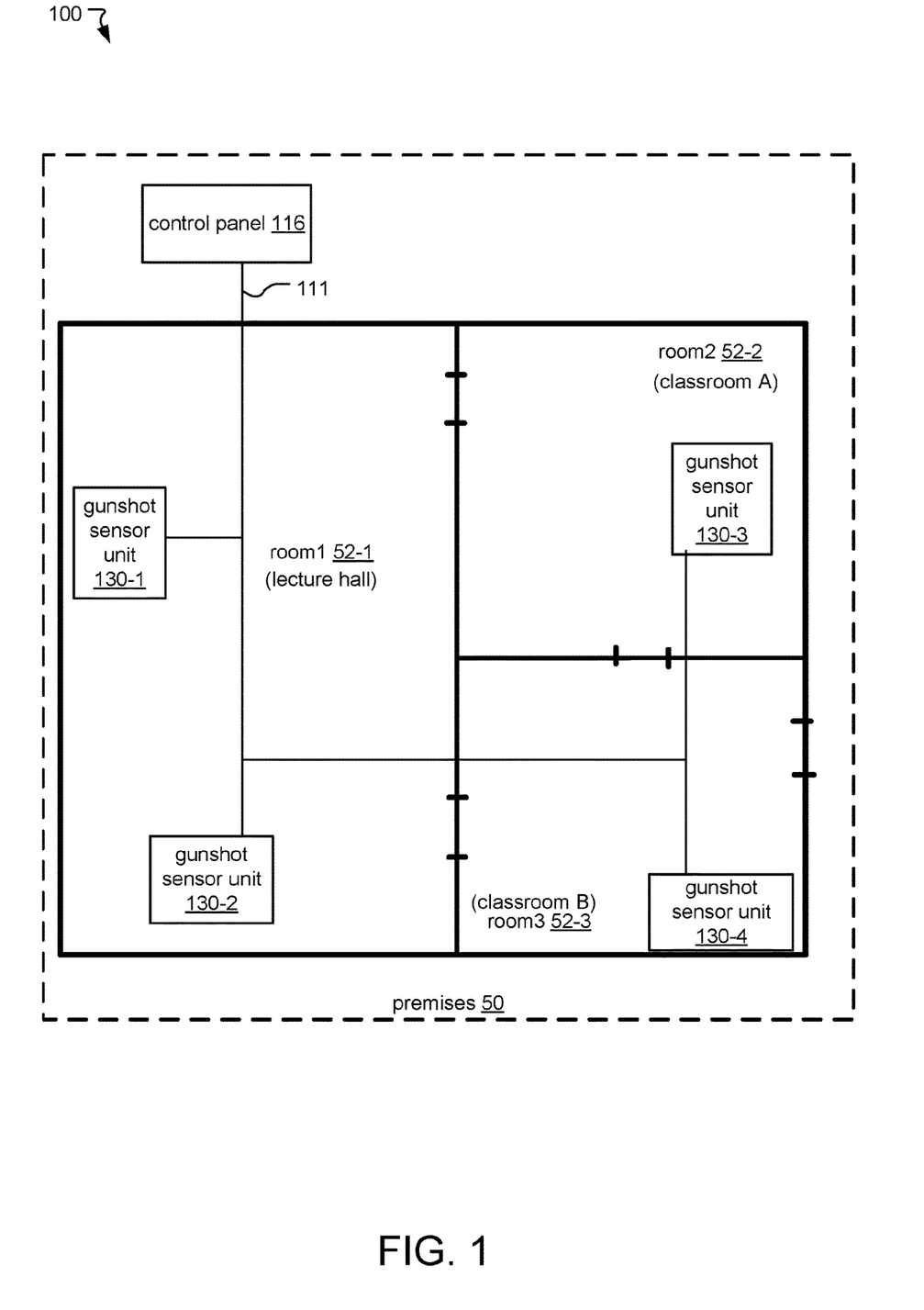
FIG. 1 is a schematic diagram of an exemplary gunshot detection system showing a common context for embodiments of the present invention.

FIG. 1 is a schematic diagram of an exemplary gunshot detection system 100.

In general, the gunshot detection system 100 monitors, detects and reports the occurrence of gunshots or other emergencies within a premises 50 such as a building (e.g. office, hospital, warehouse, retail establishment, shopping mall, school, multi-unit dwelling, government building).

In the illustrated example, the premises 50 is a simplified floor example of a building with three areas 52, a lecture hall 52-1, classroom A 52-2, and classroom B 52-3. Two gunshot sensor units 130-1, 130-2 are located in the lecture hall 52-1, while one gunshot sensor unit 130-2 is located in classroom A 52-2, and one gunshot sensor unit 130-3 is located in classroom B 52-3.

In the illustrated embodiment, the gunshot detection system 100 includes gunshot sensor units 130, a control panel 116, and a communication network 111. In general, and in one configuration, the gunshot sensor units 130 detect conditions indicative of the gunshots or other emergencies and alert the control panel 116, which takes one or more responsive actions such as alerting building personnel, law enforcement, and/or a monitoring center, or collecting and presenting data pertaining to the detected gunshots to an operator of the control panel 116. The gunshot sensor units 130 and the control panel 116 communicate over the communication network 111.

More specifically, the gunshot sensor units 130 are distributed throughout the premises 50, for example, in areas 52 of the premises such as rooms, hallways, lobbies or stairways, to name a few examples. The gunshot sensor units 130 detect acoustic anomalies indicating potential gunshots and generate audio data depicting the acoustic anomalies. The gunshot sensor units 130 also generate event data based on and descriptive of the acoustic anomalies, encrypt the event data, and locally store and/or send the encrypted event data to the control panel 116. The gunshot sensor units 130 send the encrypted event data to the control panel 116 by sending messages containing the encrypted audio data. Whether or not they contain the encrypted audio data, these messages can themselves be encrypted by the gunshot sensor units 130 before being sent. The gunshot sensor units 130 also decrypt incoming encrypted messages. Thus, the gunshot detection system 100 provides end-to-end encryption for communication links between the gunshot sensor unit 130 and the control panel 116, for example.

The event data often includes audio data (e.g. digitized audio clips) depicting the acoustic anomalies, metadata including, for example, time information indicating when the acoustic anomalies started and/or stopped, duration information for the acoustic anomalies and/or the audio data depicting the acoustic anomalies, file information, and identification information for the gunshot sensor unit 130, and sensor data generated by the gunshot sensor unit 130. The event data can be locally stored, collected by the control panel 116, transferred to remote servers, and/or transferred to devices of law enforcement entities for forensic analysis, for example.

On the other hand, the control panel 116 directs the overall functionality of the gunshot detection system 100 by sending instructions (e.g. control messages) to be executed by the gunshot sensor units 130, receiving the event data from the gunshot sensor units 130 and taking the responsive actions based on the event data. The control panel 116 might receive preliminary event data (e.g. metadata indicating time and date information) from multiple gunshot sensor units 130 and perform a de-confliction process in order to determine which event data from the different sensor units 130 pertains to the same detected acoustic anomaly and which of the gunshot sensor units 130 is closest to the source of the acoustic anomaly based on, for example, which of the units first detected the acoustic anomaly. The control panel 116 might then send instructions to the gunshot sensor unit 130 closest to the source to send full event data (e.g. including a full audio data sample, environmental data, and other sensor data) to the control panel 116 for further processing and/or to be presented to the operator. Similar to the gunshot sensor units 130, the control panel 116 encrypts outgoing messages and decrypts incoming messages, and if any of the incoming messages contain encrypted audio data, the control panel 116 further decrypts the audio data before, for example, presenting the audio data to an operator of the control panel 116.

Figure 2:
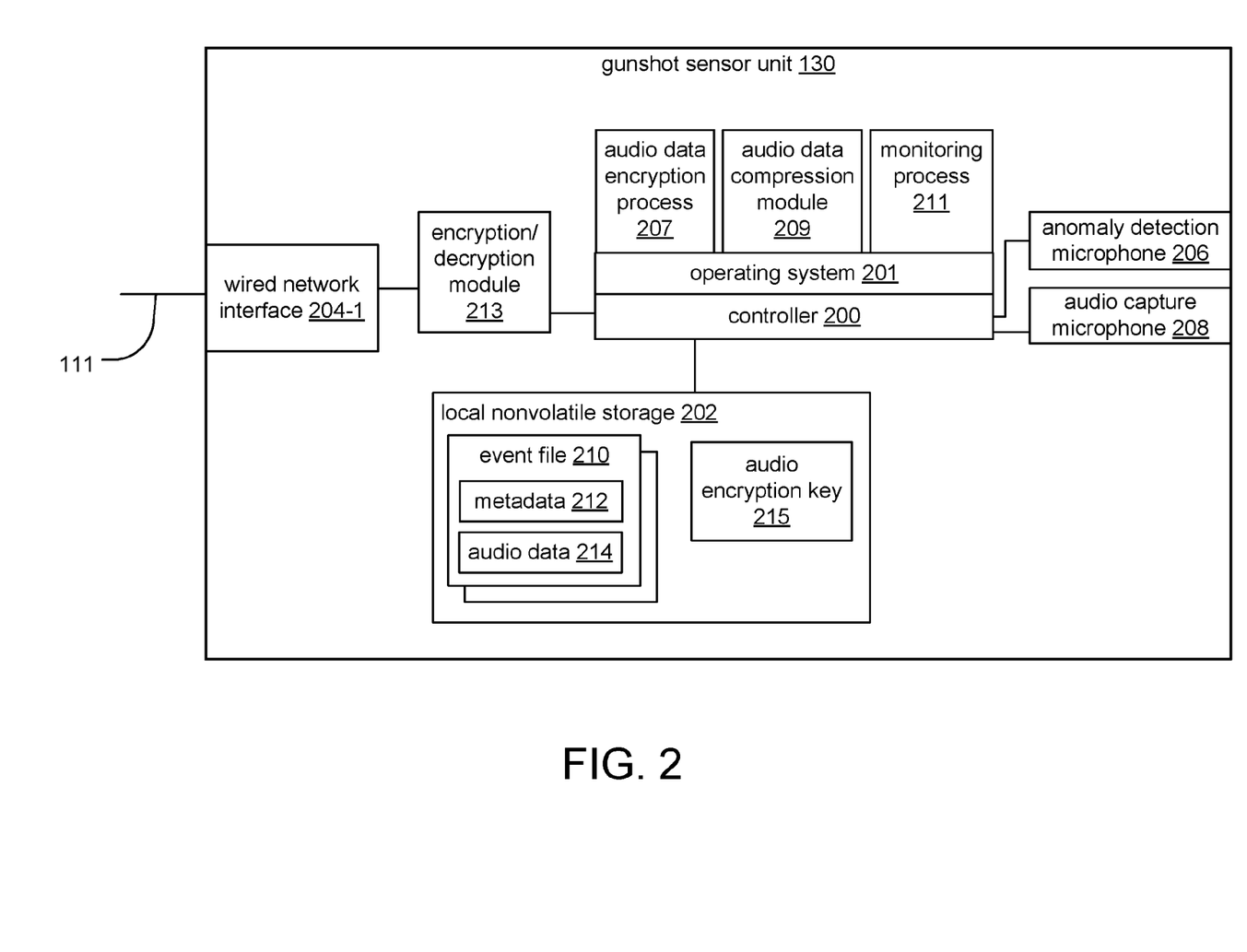
FIG. 2 is a block diagram showing an exemplary gunshot sensor unit of the gunshot detection system according to the present invention.

FIG. 2 is a block diagram showing an exemplary gunshot sensor unit 130.

The gunshot sensor unit 130 includes a controller 200, local nonvolatile storage 202, a wired network interface 204-1, an anomaly detection microphone 206, an audio capture microphone 208, and an encryption/decryption module 213.

The controller 200 executes firmware instructions and an operating system (OS) 201 and generally directs the functionality of the gunshot sensor unit 130. In one example, the controller 200 is small single-board computer. In other examples, the controller is a microcontroller unit or a system on a chip (SoC), including one or more processor cores along with memory and programmable input/output peripherals such as analog to digital converts and digital to analog converters. The operating system 201 interfaces with the hardware components of the gunshot sensor unit 130 for access by an audio data encryption process 207, an audio data compression module 209, and a monitoring process 209, which are processes executing on top of the OS 201.

The audio data encryption process 207 encrypts the audio data generated by the gunshot sensor unit 130. In one example, the audio data encryption process 207 encrypts the audio data using an audio encryption key 215 stored in the local nonvolatile storage 202. This audio encryption key 215 can be initially distributed and periodically updated by the control panel 116. In another example, the encryption keys are programmed into the hardware of the units, such as stored in read only memory (ROM). In still other examples the encryption is performed by a special purpose application specific integrated circuit (ASIC) that is programmed with both the encryption key and encryption algorithm or programmed only with the encryption algorithm.

In addition, different kinds of encryption could be used.

In one example, a Public-key, or asymmetric, encryption approach is used. Here, the control panel disseminates its public key to the sensor units while retaining its private key. The sensor units then encrypt the audio data using the public key of the control panel, allowing only the control panel to decrypt the audio data using its private key.

In another example, a symmetric encryption approach is used. Here, the algorithms for cryptography use the same cryptographic keys for both encryption of the audio data and decryption of the audio data at the control panel.

In the preferred embodiment, the audio encryption key 215 is unique for each different gunshot sensor unit 130, and all of the different decryption keys associated with the audio encryption keys 215 are stored by the control panel 116. In an alternative embodiment, the audio encryption key 215 is a "public key" associated with the control panel 116, the public key being known to the gunshot sensor units 130 allowing the gunshot sensor units 130 to encrypt the audio data such that only a "private key" counterpart to the public key known only to the control panel 116 can decrypt the audio data.

In another example, the control panel 116 might request audio encryption keys that were generated by a third party program, system, entity, and/or service, such as a cloud service executing on an application server accessible to the control panel 116 via a networks including one or more public network such as the internet. These encryption keys could then be distributed to the gunshot sensor units 130 and the control panel. These keys might be symmetric or asymmetric decryption keys. Similarly, the control panel 116 might request the decryption key(s) from the third party service before decrypting the encrypted audio data from the gunshot sensor units 130 or send the encrypted audio data directly to the third party service to be decrypted remotely. The third party service might be administered by a law enforcement entity, or the third party service might provide the decryption keys and/or decryption service only to law enforcement personnel, or to operators of the control panel 116 with superuser credentials, or in response to receiving a subpoena for the decrypted audio data, in examples.

The monitoring process 211 monitors the communication network 111 and determines current network conditions by measuring and/or analyzing network performance metrics such as bandwidth, throughput, latency, jitter and/or error rate. The monitoring process 211 generates and sends network conditions information to the audio data compression module 209 based on the determined network conditions.

The audio data compression module 209 compresses the audio data based on the network conditions of the communication network 111. The audio data compression module 209 might request and receive the network conditions information from the monitoring process 211 and compress the audio data based on the network conditions information. The audio compression module 209 uses data compression algorithms to encode the audio data using fewer bits than the originally generated audio data used. In one example, the audio compression module 209 might remove from the audio data or de-emphasize the accuracy of perceptually irrelevant information (e.g. pertaining to sounds that are difficult or impossible for humans to hear). Different compression methods might be used based on the network conditions indicated by the network conditions information. For example, a lossy compression method resulting in compressed audio data with 5 to 20% of the originally generated audio data might be used when the network conditions information indicates a congested or unreliable connection. On the other hand, a lossless method resulting in compressed audio data with 50 to 60% of the originally generated audio data might be used when the network conditions information indicates a reliable connection. The audio data compression module 209 might even send the originally generated audio data without performing any data compression at all, based on the network conditions.

The wired network interface 204-1 provides connectivity with the control panel 116 and possibly other devices via a wired link to the communication network 111, using a cable (e.g. twisted pair, coaxial, fiber optic) connected to a port of the wired network interface 204-1, for example. In addition, the network also provides power to the device, in many examples. Direct current (DC) is superimposed upon the data that is transmitted between the devices and other nodes on the network.

The encryption/decryption module 213 encrypts and decrypts messages exchanged via the network interface 204 by the gunshot sensor units 130, the control panel 116 and/or other devices on the communication network 111. Specifically, the encryption/decryption module 213 encrypts outgoing messages to be sent by the gunshot sensor units 130 and decrypts incoming encrypted messages received by the gunshot sensor units 130. In one example, the encryption/decryption module 213 is implemented in hardware as an intervening chip between the controller 200 and the network interface 204. The encryption/decryption module 213 may include or be part of a secure cryptoprocessor with built in anti-tamper and other physical security measures. In another example, the encryption/decryption module, the operating system 201, audio data encryption process 207, audio data compression module 209, and/or the monitoring process 211 all execute on a secure cryptoprocessor, which also stores the encrypted audio data.

The anomaly detection microphone 206 detects the acoustic anomalies, while the audio capture microphone 208 captures ambient sound and generates the audio data. In one embodiment, both microphones 206, 208 are micro electro-mechanical system (MEMS) microphones having different sensitivity levels, and the controller 200 is configured to sample the microphones 206, 208 such that outputs from the microphones can be continuously analyzed in near real time for an acoustic signature. The anomaly detection microphone 206 has the lower sensitivity level and a high clipping level, while the audio capture microphone 208 has the higher sensitivity level. The audio capture microphone 208 continuously captures ambient sound, which is stored in a 9.9 second (for example) loop in a ring buffer of the controller 200. At the same time, incoming acoustic signals from the anomaly detection microphone 206 are continuously analyzed to detect acoustic anomalies, particularly by searching the incoming acoustic signal for a peak amplitude level large enough to be at least preliminarily identified as a gunshot.

Once an indication of a possible gunshot has been triggered utilizing the anomaly detection microphone 208, further processing may be performed by the controller 200. The controller 200 analyzes the sound stored in the loop to confirm that the acoustic anomaly is a gunshot. If confirmed as gunshot, the controller stores the captured sound stored in the loop buffer 216, which would include the acoustic anomaly and the previously captured sound (up to 9.9 seconds, in this example) as audio data 214 in the local nonvolatile storage 202 associated with different event files 210 or instances of event data for different gunshot detection events, along with the metadata 212, which includes the time and/or data information for the events. In embodiments, the local nonvolatile storage 202 could be fixed storage such as flash memory, or removable storage such as an SD card, among other examples.

Figure 3:
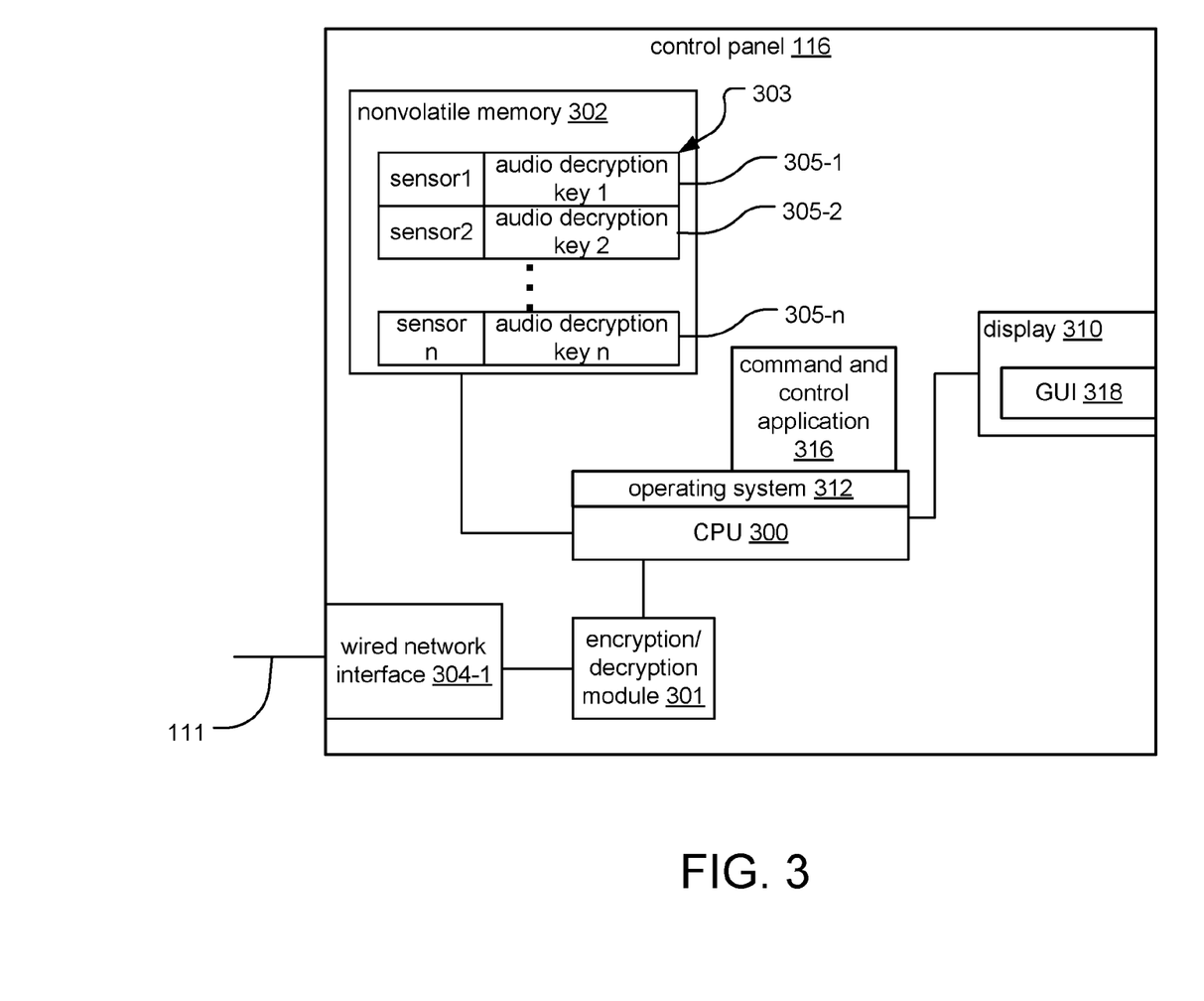
FIG. 3 is a block diagram showing an exemplary control panel of the gunshot detection system according to the present invention.

FIG. 3 is a block diagram showing an exemplary control panel 116.

The control panel 116 includes a central processing unit (CPU) 300, nonvolatile memory 302, a wired network interface 304-1, a display 310, and an encryption/decryption module 301.

Similar to analogous components on the gunshot sensor units 130, the wired network interface 304-1 provides connectivity with the gunshot sensor units 130 and possibly other devices via a wired link to the communication network 111. In some examples, the control panel may also supply power to the units.

Similarly, the encryption/decryption module 301 encrypts and decrypts messages exchanged via the network interface 304 by the control panel 116, the gunshot sensor units 130 and/or other devices on the communication network 111. Specifically, the encryption/decryption module 301 encrypts outgoing messages to be sent by the control panel 116 and decrypts incoming encrypted messages received by the control panel 116.

The CPU 300 executes firmware instructions and an operating system (OS) 312 and generally directs the functionality of the control panel 116. The OS 312 interfaces with the hardware components of the control panel 116 for access by a command and control application 316, which is a software process executing on top of the OS 312.

The command and control application 316, in general, generates a graphical user interface (GUI) 318 that is rendered on the display 310 (e.g. touchscreen display) of the control panel 116. In one example, the GUI 318 might present gunshot sensor unit information to an operator of the control panel 116 and receive input indicating selections of various options for controlling the gunshot sensor units 130 such as programming the encryption and/or decryption keys for the control panel 116 and/or the gunshot sensor units 130. In one example, the command and control application 316 might also be configured to decrypt the encrypted audio data received from the gunshot sensor units 130 and present the decrypted audio data (e.g. via speakers) based on input from the operator received via the GUI.

The nonvolatile memory 302 stores the audio decryption keys 305 for decrypting the encrypted audio data received from the gunshot sensor units 130. In the illustrated example, the audio decryption keys 305 are stored in an audio decryption key table 303. As previously described, in one example, the audio decryption key table 303 might include a series of audio, symmetric or asymmetric, decryption keys 305, with each of the keys being associated with a different one of the gunshot sensor units 130. The encrypted audio data received from the gunshot sensor units 130 are decrypted using the associated audio decryption keys 305. On the other hand, in an alternative example, there might only be one audio decryption key 305 used to decrypt the encrypted audio data received from all of the gunshot sensor units 130.

Figure 4:
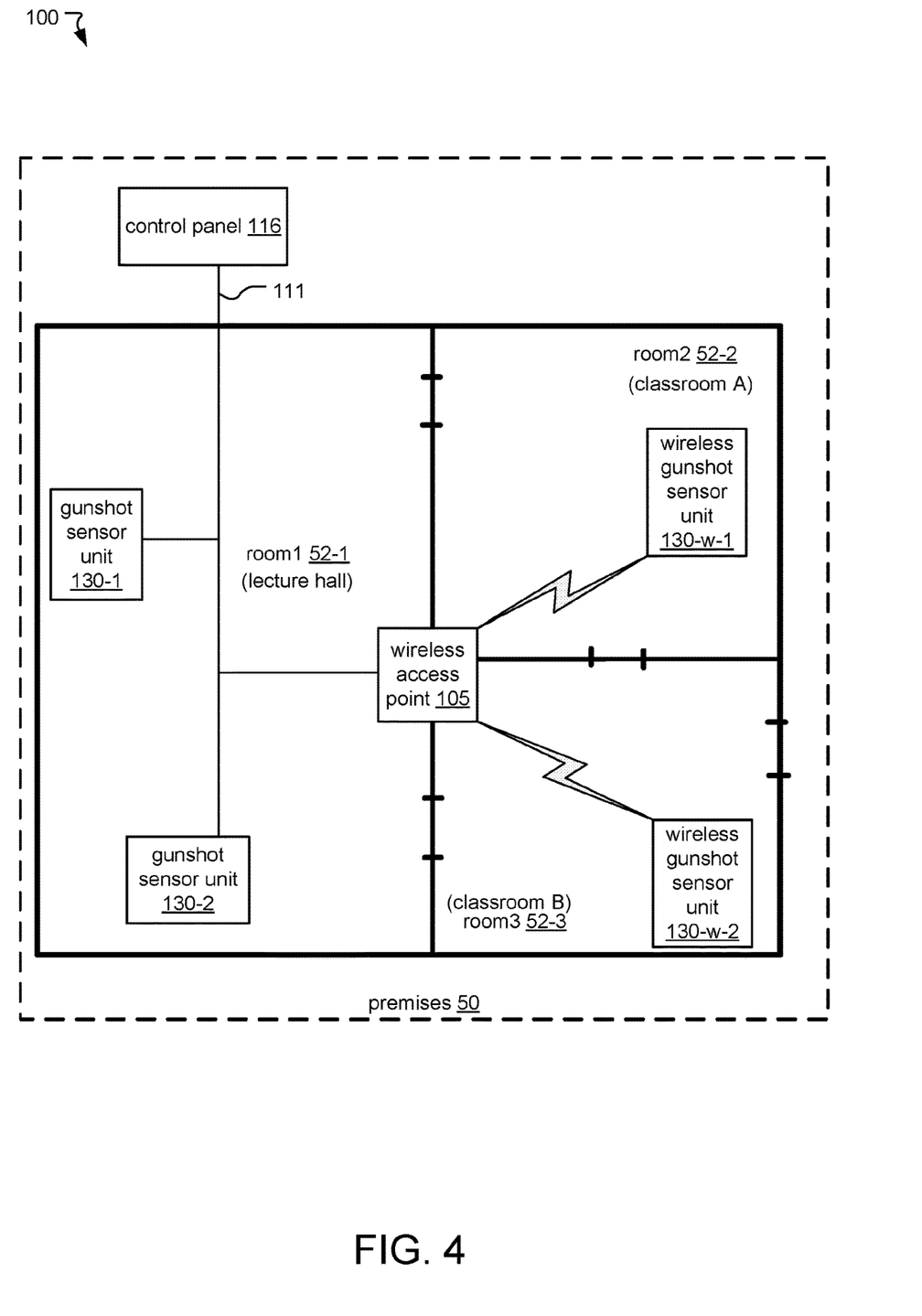
FIG. 4 is a schematic diagram of an exemplary gunshot detection system including wireless-capable gunshot sensor units.

FIG. 4 is a schematic diagram of an exemplary gunshot detection system 100 according to another embodiment including a hybrid network with wireless-capable gunshot sensor units 130-w. Here, a wireless access point 105 of the premises 50, which might be, for example, a wireless router, connects to the wireless gunshot sensor units 130-w via wireless links. The wireless access point 105 provides connectivity between the wireless gunshot sensor units 130-w and the communication network 111.

Figure 5:
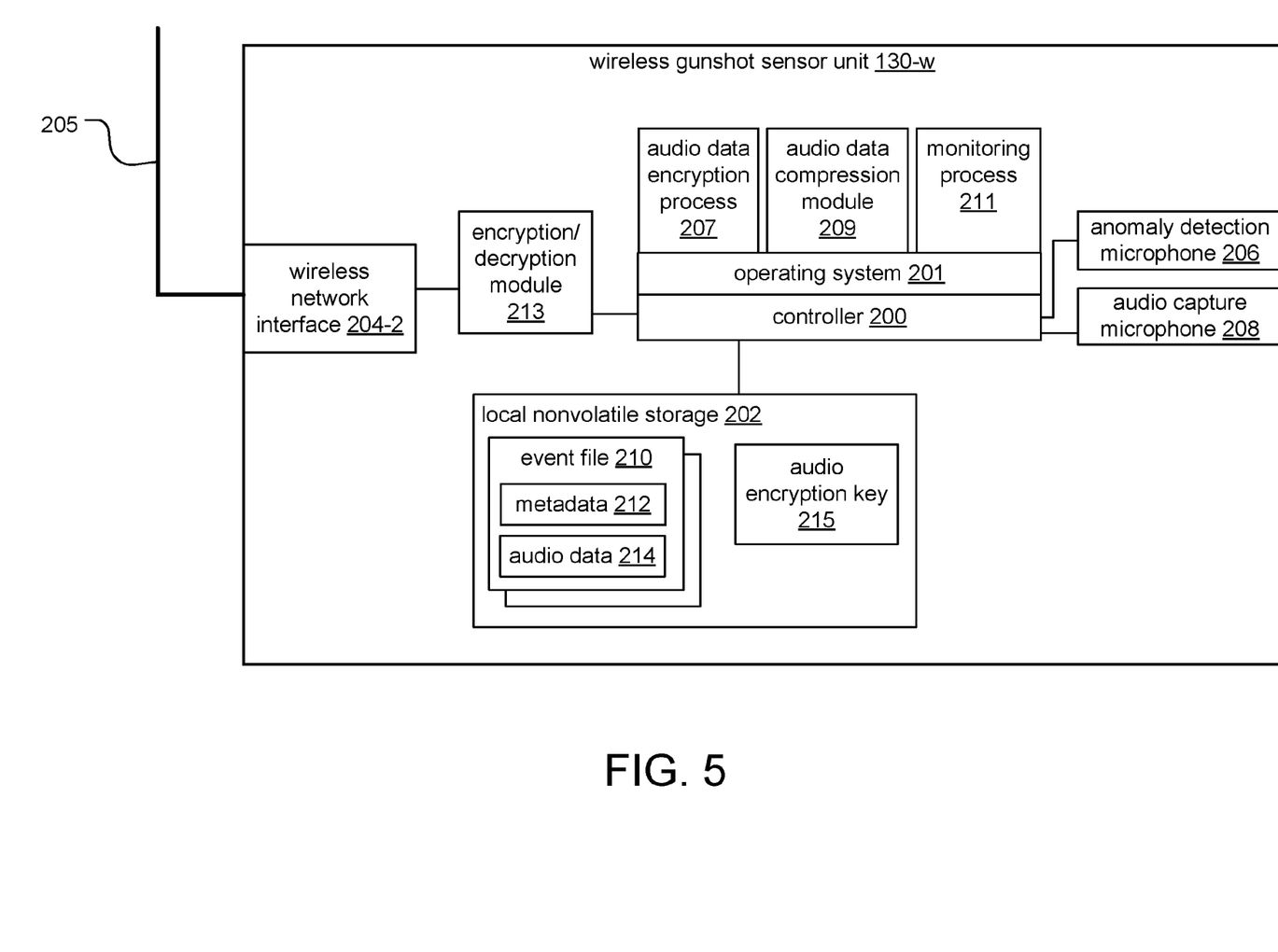
FIG. 5 is a block diagram showing an exemplary wireless-capable gunshot sensor unit.

FIG. 5 is a block diagram showing an exemplary wireless-capable gunshot sensor unit 130-w. Here, instead of the wired network interface 204-1, the wireless-capable gunshot sensor unit 130-w includes a wireless network interface 204-2 and an antenna 205. The wireless network interface 204-2 provides connectivity with the control panel 116 and possibly other devices via a wireless link to the communication network 111 via the antenna 205.

The wireless network interface 204-2 implements IEEE 802.11 standards, in one embodiment. It can use the 2.4 gigahertz UHF or 5.8 gigahertz SHF ISM radio bands.

In another embodiment, the wireless network interface 204-2 implements IEEE 802.15 standards, such as Bluetooth or Bluetooth Low Energy. In this case, the wireless network interface 204-2 could be used by the gunshot sensor units 130 to transmit encrypted audio data to handheld units (e.g. mobile computing devices) of law enforcement and/or other authorized entities.

In another embodiment, the wireless network interface 204-2 implements one or more standards associated with cellular technologies, such as Global System for Mobile communications (GSM) technologies in the range of 380 to 1900 MHz, Universal Mobile Telecommunications System (UMTS)/3G technologies in the range of 700 to 3500 MHz, Long Term Evolution (LTE) technologies in the range of 450 to 5900 MHz, and/or 5G technologies in the ranges of 600 to 4700 MHz or 24 to 39 GHz. In one example, the gunshot sensor units 130 communicate via a distributed antenna system (DAS) implemented locally within the premises 50 or across a wider geographical area using the wireless network interface 204-2. The DAS might also be implemented in conjunction with an in-building cellular enhancement system for extending and distributing cellular signal of a mobile network within the premises 50.

Figure 6:
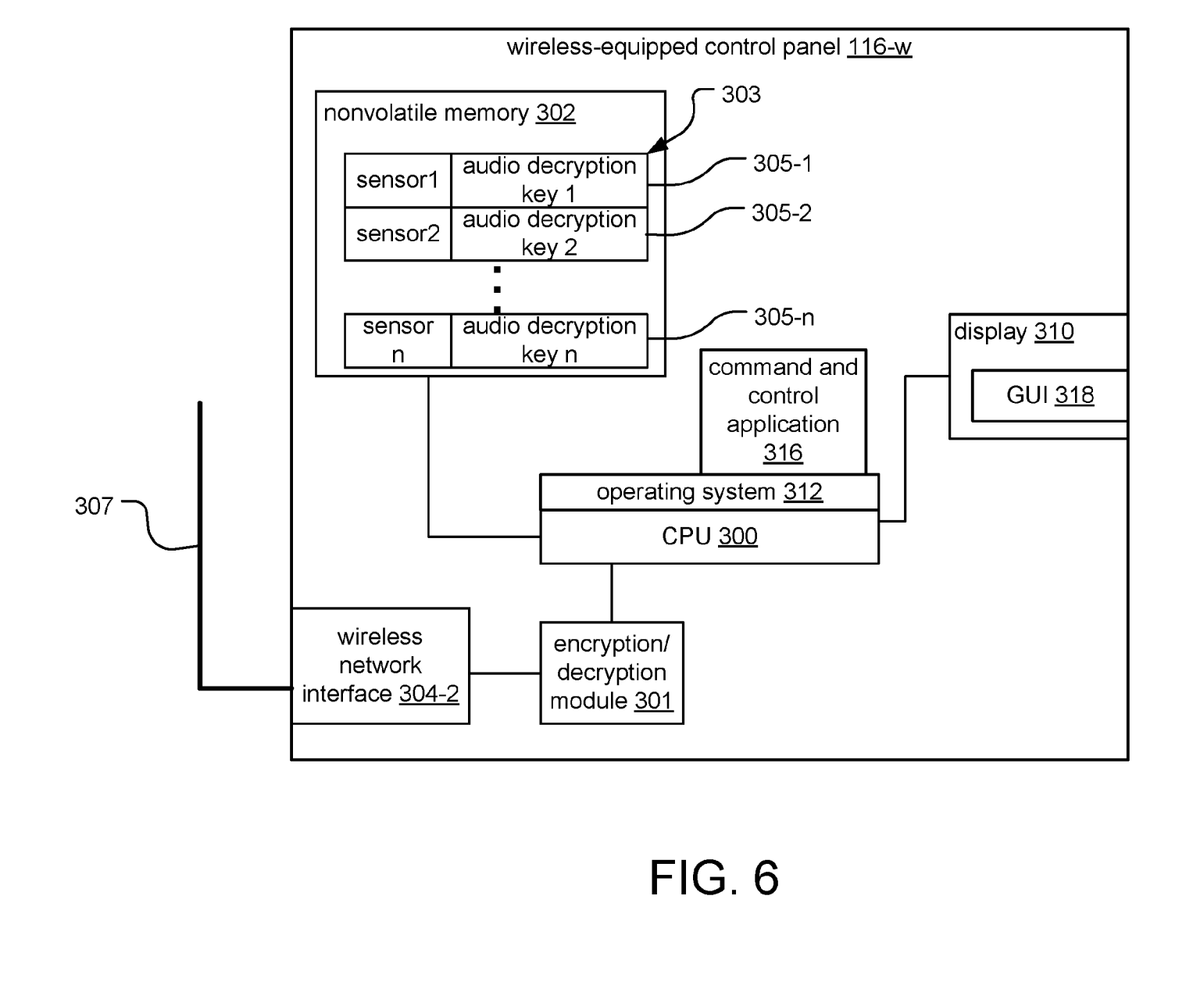
FIG. 6 is a block diagram showing an exemplary wireless-capable control panel.

FIG. 6 is a block diagram showing an exemplary wireless-capable control panel 116-w. Here, instead of the wired network interface 304-1, the wireless-capable control panel 116-w includes a wireless network interface 304-2 and an antenna 307. The wireless network interface 304-2 provides connectivity with the gunshot sensor units 130 and possibly other devices via a wireless link to the communication network 111 via the antenna 307.

Figure 7:
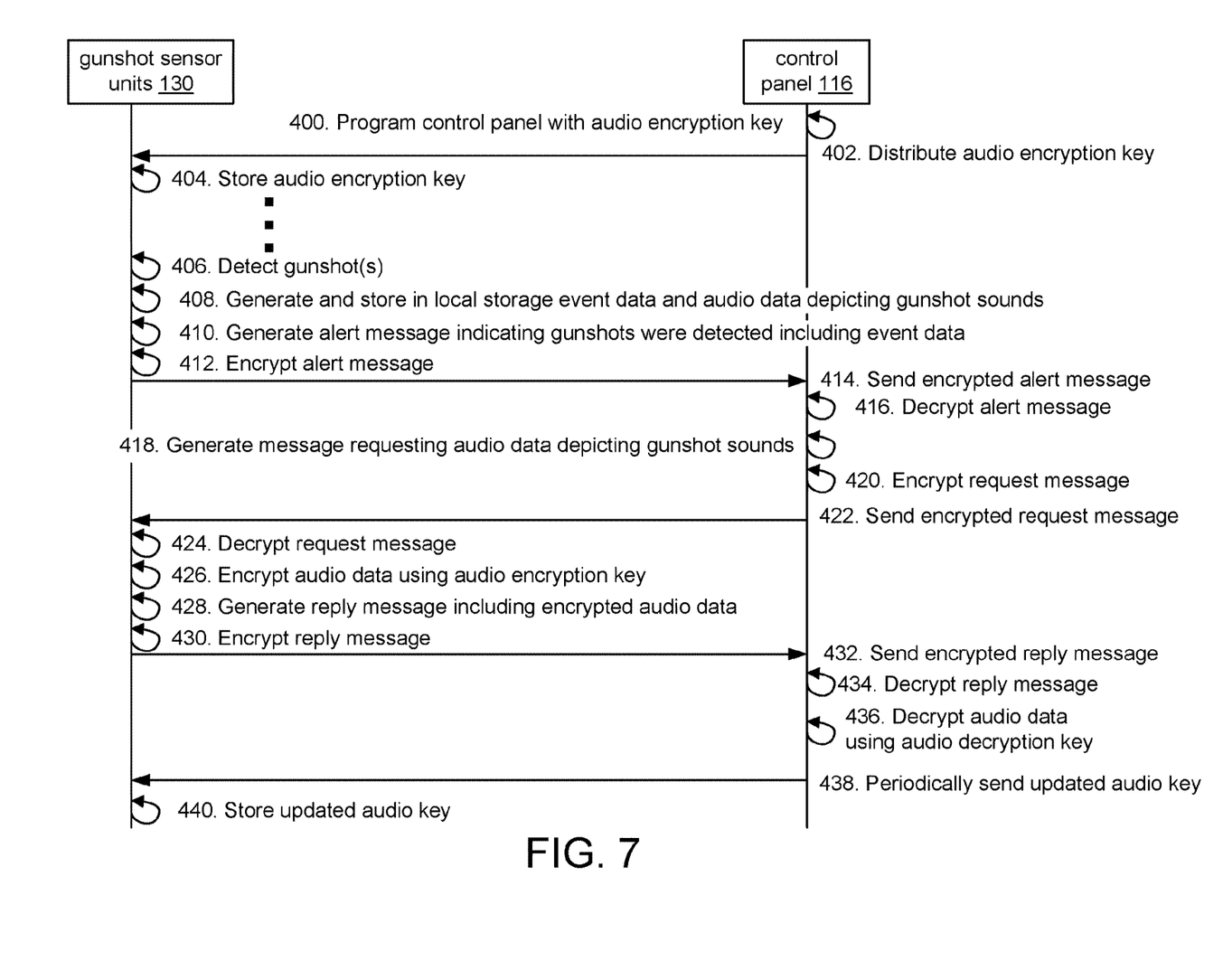
FIG. 7 is a sequence diagram illustrating a process by which gunshot detection system encrypts and decrypts the audio data and messages exchanged between the gunshot sensor units and the control panel.

FIG. 7 is a sequence diagram illustrating a process by which gunshot detection system encrypts and decrypts the audio data and messages exchanged between the gunshot sensor units 130 and the control panel 116. The following process could apply to both the wired and wireless embodiments of the gunshot sensor units 130.

First, in step 400, the control panel 116 is programmed with the encryption key(s) for encrypting the audio data, which the control panel 116 distributes to the gunshot sensor units 130 in step 402. But, in other examples, the sensor units are preprogrammed with the keys. In step 404, the audio encryption keys are stored by the gunshot sensor units 130 in the local nonvolatile storage 202, for example.

After a period of time (for example, a year or two after initial programming of the units), in step 406, the gunshot sensor units 130 detect gunshots, and, in step 408, the gunshot sensor units 130 generate and store in local nonvolatile storage 202 event data including audio data depicting acoustic anomalies (e.g. the gunshot sounds). Preferably, this audio data is first encrypted prior to being stored.

In step 410, the gunshot sensor units 130 generate alert messages indicating that the gunshots were detected. These alert messages might include partial event data such as metadata indicating the time and/or duration of the detected shots. In step 412, this alert message is encrypted by the encryption/decryption module 213. The gunshot sensor units 130 send the encrypted alert messages to the control panel 116 in step 414.

In step 414, the control panel 116 decrypts the encrypted alert messages via the encryption/decryption module 301. In step 420, the control panel 116 generates a request message requesting the audio data depicting the gunshot sounds. The control panel 116 then encrypts this request message in step 420 and sends the encrypted request message to the gunshot sensor units 130 in step 422.

In step 424, the gunshot sensor units 130 decrypt the encrypted request message via the encryption/decryption module 213. In response to the request message, in step 426, the gunshot sensor units 130 then encrypt the audio data, if not previously encrypted, using the stored audio encryption key 215 via the audio data encryption process 207. The gunshot sensor units 130 then generates a reply message containing the encrypted audio data in step 428 and encrypts the reply message in step 430 via the encryption/decryption module 213. This encrypted reply message is then sent by the gunshot sensor units 130 to the control panel 116 in step 432.

In step 434, the control panel 116 decrypts the encrypted reply message via the encryption/decryption module 301. The control panel 116, in step 436, also decrypts the audio data contained within the decrypted reply message using the audio decryption key 305 associated with the gunshot sensor units 130 from which the messages were sent. This audio data can then be presented, for example, via speakers of the control panel 116.

In step 438, the control panel 116 periodically sends updated audio encryption keys to the gunshot sensor units 130, and the gunshot sensor units 130 store the updated audio encryption keys in the local nonvolatile storage 202.

Figure 8:
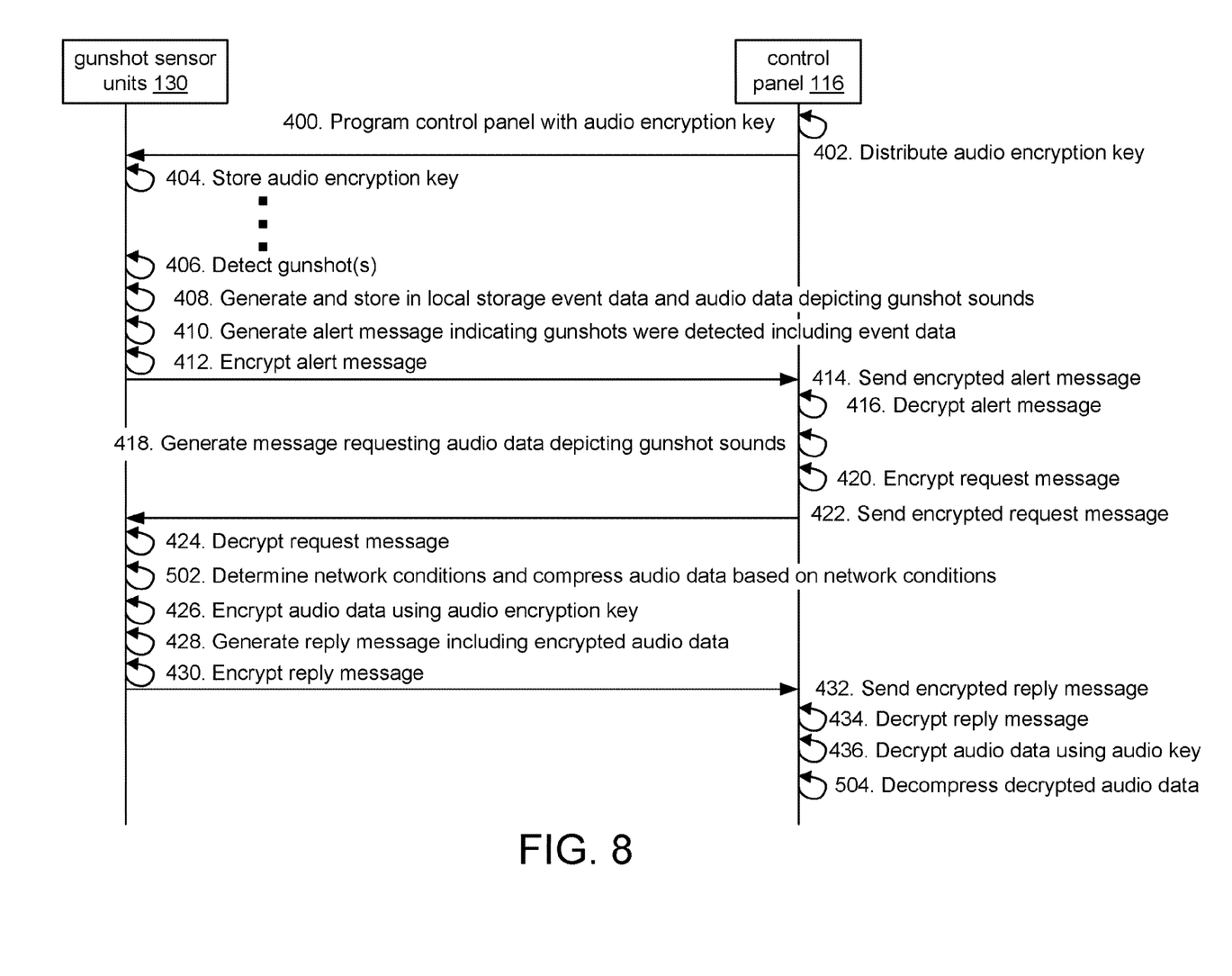
FIG. 8 is a sequence diagram illustrating a process by which the gunshot sensor units compress the audio data based on current network conditions.

FIG. 8 is a sequence diagram illustrating a process by which the gunshot sensor units 130 compress the audio data based on conditions of the communication network 111. As in FIG. 7, this process could apply to both the wired and wireless embodiments of the gunshot sensor units 130.

Steps 400 through 424 proceed as previously described, as the gunshot sensor units 130 detect gunshots, alert the control panel 116, and receive request messages to send the audio data.

Now, however, in step 502, the gunshot sensor units determine network conditions of the communication network 111 via the monitoring process 211 and compress the audio data based on the network conditions via the audio data compression module 209.

In steps 426 through 436, the compressed audio data is encrypted and sent to the control panel 116 as previously described.

In step 504, as appropriate based on the compression method used, the control panel 116 might then decompress the audio data.

In another example, the gunshot sensor units 130 might encrypt the audio data, generate a message including the encrypted audio data, encrypt the message via the encryption/decryption module, and send the encrypted message to a third party cloud service (for example, executing on a service accessible to the gunshot sensor units 130 and/or control panel 116 only via a public network such as the internet). The third party cloud service might then process requests for the encrypted audio data from the control panel 116 or other devices.

While this invention has been particularly shown and described with references to preferred embodiments thereof, it will be understood by those skilled in the art that various changes in form and details may be made therein without departing from the scope of the invention encompassed by the appended claims.

What is claimed is:

1. A system for detecting gunshots within a premises, the system comprising:
   gunshot sensor units for detecting gunshots, each of the gunshot sensor units comprising one or more microphones for detecting acoustic anomalies and generating audio data depicting the acoustic anomalies and a controller for encrypting the audio data,
   wherein the gunshot sensor units generate messages including the encrypted audio data and encrypt the messages via encryption/decryption modules of the gunshot sensor units, wherein encrypting the messages includes further encrypting the encrypted audio data; and
   a control panel for receiving the encrypted messages, wherein the control panel decrypts the encrypted messages via an encryption/decryption module of the control panel before further decrypting the encrypted audio data contained in the messages.

2. The system as claimed in claim 1, wherein the gunshot sensor units further comprise local nonvolatile storage for storing the encrypted audio data.

3. The system as claimed in claim 1, wherein the control panel further comprises nonvolatile memory for storing audio decryption keys associated with the gunshot sensor units, and the control panel decrypts the audio data from each of the gunshot sensor units using the associated audio decryption key.

4. The system as claimed in claim 1, wherein the gunshot sensor units further comprise local nonvolatile storage for storing audio encryption keys, and the gunshot sensor units encrypt the audio data using the stored audio encryption keys.

5. The system as claimed in claim 4, wherein the control panel distributes the audio encryption keys to the gunshot sensor units.

6. The system as claimed in claim 4, wherein the control panel periodically sends updated audio encryption keys to the gunshot sensor units.

7. The system as claimed in claim 1, wherein the gunshot sensor units comprise wireless network interfaces for wirelessly sending the encrypted audio data to the control panel via a communication network.

8. The system as claimed in claim 1, wherein each of the gunshot sensor units further comprise one or more microphones for detecting acoustic anomalies and generating audio data depicting the acoustic anomalies and an audio data compression module executing on the controller, the audio data compression module determining network conditions of the communication network, compressing the audio data based on the network conditions and sending the compressed audio data to the control panel via the wireless network interface.

9. The system of claim 1, wherein at least one gunshot sensor unit comprises:
   an anomaly detection microphone for detecting acoustic anomalies within a predefined space and generating audio data depicting the acoustic anomalies;
   an audio capture microphone for capturing ambient sound from the predefined space and generating ambient audio data;
   a network interface for interfacing with a network; and
   said controller further comprising:
      a monitoring process which
         monitors the network and determines current network conditions, and
         generates and sends the determined network conditions to an audio data compression module;
      said audio data compression module that compresses audio data based on the network conditions of the communication network, wherein different compression methods are used based on the network conditions information; and
      an audio data encryption process for encrypting audio data that depicts the acoustic anomalies and/or the ambient audio data, whether compressed or not; and
   wherein at least one outgoing message includes event data.

10. The system of claim 9, wherein the event data includes audio data depicting the acoustic anomalies.

11. The system of claim 9, wherein the event data comprises any of:
   time information indication when the acoustic anomalies started and/or stopped;
   duration information for the acoustic anomalies and/or the audio data depicting the acoustic anomalies;
   file information; and
   identification information for the gunshot sensor unit.

12. The system of claim 9, wherein the monitoring process determines current network condition by measuring and/or analyzing and or all of: bandwidth, throughput, latency, jitter and/or error rate.

13. A method for detecting gunshots within a premises, the method comprising:
   gunshot sensor units detecting acoustic anomalies,
   the gunshot sensor units generating audio data depicting the acoustic anomalies via one or more microphones,
   the gunshot sensor units encrypting the audio data,
   the gunshot sensor units generating messages including the encrypted audio data and encrypting the messages via encryption/decryption modules of the gunshot sensor units, wherein encrypting the messages includes further encrypting the encrypted audio data; and
   a control panel receiving the encrypted messages and decrypting the encrypted messages via an encryption/decryption module of the control panel, and
   the control panel further decrypting the encrypted audio data contained in the messages.

14. The method as claimed in claim 13, further comprising the gunshot sensor units storing the encrypted audio data in local nonvolatile storage of the gunshot sensor units.

15. The method as claimed in claim 13, further comprising the control panel storing audio decryption keys associated with the gunshot sensor units in nonvolatile memory of the control panel and decrypting the audio data from each of the gunshot sensor units using the associated audio decryption key.

16. The method as claimed in claim 13, further comprising the gunshot sensor units storing audio encryption keys in local nonvolatile storage of the gunshot sensor units and encrypting the audio data using the stored audio encryption keys.

17. The method as claimed in claim 16, further comprising the control panel distributing the audio encryption keys to the gunshot sensor units.

18. The method as claimed in claim 16, further comprising the control panel periodically sending updated audio encryption keys to the gunshot sensor units.

19. The method as claimed in claim 13, further comprising the gunshot sensor units wirelessly sending the encrypted audio data to the control panel via wireless network interfaces of the gunshot sensor units and a communication network.

20. A system for detecting gunshots within a premises, the system comprising:
   a communication network;
   a control panel connected to the communication network; and
   gunshot sensor units for detecting gunshots, each of the gunshot sensor units comprising a controller for exchanging messages with the control panel, an encryption/decryption module for encrypting messages to be sent to the control panel and decrypting encrypted messages received from the control panel, and a network interface for sending and receiving the encrypted messages via the communication network,
   wherein encrypting the messages includes further encrypting the encrypted audio data, and
   wherein the control panel decrypts the encrypted messages from the gunshot sensor units via an encryption/decryption module of the control panel before further decrypting encrypted audio data contained in the messages.

* * * * *